United States Patent
Patel et al.

(10) Patent No.: US 7,877,167 B1
(45) Date of Patent: Jan. 25, 2011

(54) REDUCING VIBRATION IN AN ELECTRONIC SYSTEM

(75) Inventors: Chandrakant D. Patel, Fremont, CA (US); Cullen E. Bash, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1064 days.

(21) Appl. No.: 11/645,400

(22) Filed: Dec. 26, 2006

(51) Int. Cl.
*G01M 1/38* (2006.01)
(52) U.S. Cl. .................. 700/280; 700/300; 702/56
(58) Field of Classification Search .......... 700/280, 700/299–300; 73/570; 702/56
See application file for complete search history.

(56) References Cited

U.S. PATENT DOCUMENTS

| | | | |
|---|---|---|---|
| 2003/0223144 A1* | 12/2003 | Smith et al. | 360/69 |
| 2003/0231422 A1* | 12/2003 | Zhang et al. | 360/77.02 |
| 2004/0105231 A1* | 6/2004 | Chen et al. | 361/685 |
| 2006/0007592 A1* | 1/2006 | Takaishi et al. | 360/78.06 |
| 2006/0255290 A1* | 11/2006 | Bhadare et al. | 250/443.1 |
| 2008/0105033 A1* | 5/2008 | Tipler et al. | 73/23.42 |

* cited by examiner

*Primary Examiner*—Paul L Rodriguez
*Assistant Examiner*—Nathan Laughlin (57) ABSTRACT

In a method for reducing vibration in an electronic system, at least one component of interest that is subject to vibration is identified, at least one component that is a source of the vibration is identified, a resonant frequency of the at least one component of interest is determined, and the at least one source component is operated at a first frequency other than the resonant frequency during run time of the system.

16 Claims, 9 Drawing Sheets

REDUCING VIBRATION IN AN ELECTRONIC SYSTEM

BACKGROUND

Electronic systems have been developed to operate at faster speeds while occupying smaller spaces. Thus, electronic systems have been designed to include a relatively dense configuration of microprocessors and other components to maximize processing power while minimizing the space required by the electronic systems. As the microprocessors and electronic systems become smaller and more dense, they also generate larger amounts of heat, thereby increasing the difficulty in maintaining these heat-generating components within acceptable temperature levels.

Fans, pumps, air compressors and other cooling mechanisms may be employed to dissipate the heat generated by the components contained in the electronic systems. Such cooling mechanisms are typically mounted in an electronic system, for example, to a system frame, to blow and circulate cool air through the electronic system. The structural dynamic coupling of the aforementioned cooling mechanisms to sensitive system components, such as memory drives or other disc drives, poses a big potential risk. That is because the operational vibration of such cooling mechanisms may induce or amplify the natural frequencies of the system components. In turn, this causes unwanted vibration of the system components, which can result in severe performance degradation or failure of such components. For example, unwanted vibration may cause head-off-track problems in disc drives, wherein drive heads may be temporarily or permanently displaced from their intended tracks, causing performance degradation or failure in the disc drives. While it is possible to recover from drive failures with retries when the drive heads are temporarily displaced, the drive performance degradation can be severe. On the other hand, a permanent displacement of a drive head results in a permanent failure of the associated disc drive.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Described herein are methods and systems for reducing vibration in an electronic system in order to reduce or eliminate performance degradation and failures of various components therein. As referred herein, an electronic system is any system that is electrically powered. Examples of an electronic system include but are not limited to computer systems (such as a mainframe computer, a server, a laptop or notebook personal computer or PC, or a desktop PC), projectors, an electronic data storage array, an electronic data bank, a personal digital assistant (PDA), an MP3 player or any electrically powered device that includes one or more components therein that are susceptible performance degradation or failure due to undue system vibration that may excite the natural or resonant frequency of the components therein. Examples of such components are disc drives, particularly high-density hard disc drives, that are susceptible to system vibration due to its mounting or coupling to the system.

Figure 1A:
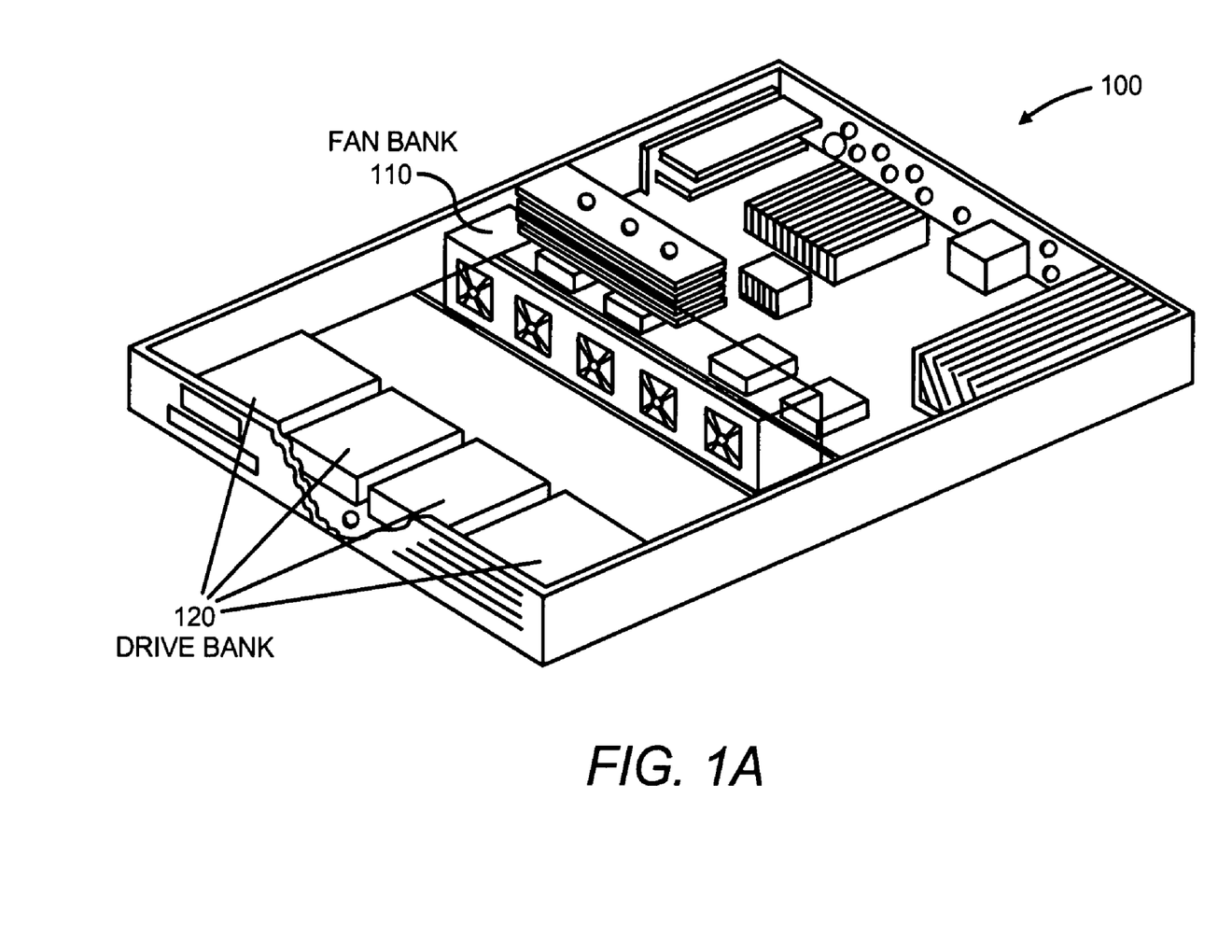
FIG. 1A illustrates an electronic system wherein various embodiments of vibration reduction in the present invention is applicable.

FIG. 1A illustrates the construction of an electronic system 100, such as a computer system, with system components such as one or more fan banks 110 and one or more drive banks 120, in which various embodiments of the present invention are applicable for reducing vibration in order to reduce or eliminate performance degradation and failure of the system components therein. FIGS. 2-7 illustrate various methods 200-700 for reducing the operational vibration of an electronic system, such as the system 100, in accordance with various embodiments of the present invention. For illustrative purposes only and not to be limiting thereof, the methods 200-400 are discussed in the context of the system 100 illustrated in FIG. 1A.

Figure 2:
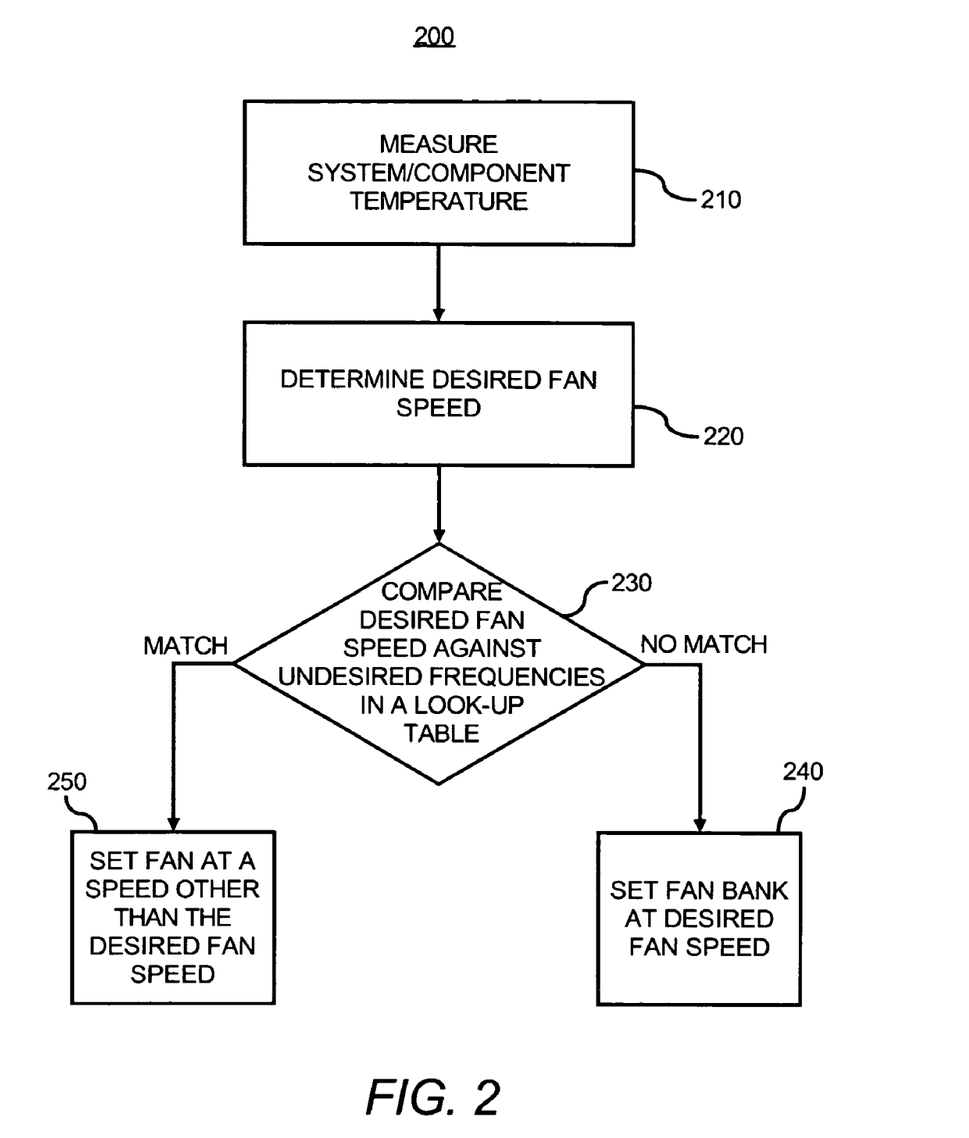
FIG. 2 illustrates a run-time method for operating one or more components in the electronic system illustrated in FIG. 1A, in accordance with one embodiment of the present invention.

FIG. 2 illustrates a run-time method 200 for operating a cooling mechanism, such as the fan bank 110, in a system, such as the electronic system 100, while reducing or eliminating performance degradation or failure in one or more other system components of interest, such as the drive bank 120, in the system 100, in accordance with one embodiment of the present invention.

At 210, at run time, that is, when the system 100 is in operation, the operating temperature of the system 100, including its heat-generating components therein (e.g., microprocessors, disc drives, data buses), are measured or detected on a periodic basis at predetermined time intervals. The temperature measurements are obtained by, for example, temperature or thermal sensing devices placed at desired locations or components in the system 100.

At 220, for each temperature measurement cycle or interval, a determination is made as to the desired operational frequency of the fan bank 110, such as the fan speed or rotational frequency of the fan bank 110, based on the temperature measurement. The desired operational frequency of the fan bank 110 is the frequency at which the cooling mechanism is to operate to effectively reduce the temperature of the system 100 to a predetermined threshold level or lower. For example, the determination may include raising the rotational frequency of the fan bank 110 to increase air flow when the measured system temperature is above the predetermined threshold level) or reducing the rotational frequency of the fan bank 110 when the measured system temperature is below the predetermined threshold level, and higher temperature can be afforded as a trade-off for, e.g., lower power consumption. Accordingly, this determination is based on one or more characteristics of the system 100, such as the power consumption of the fan bank 110, the critical temperatures of the heat-generating components in the system 100 at which such components exhibit performance degradation or failure (from which the predetermined threshold level may be based). These characteristics may be set or entered by a designer or user of the system 100. Consequently, the temperature measurement of the system 100 acts as a feedback for proper thermal management of the system 100, wherein there is a predetermined operational frequency of the fan bank 110 for each temperature measurement. In one embodiment, one or more temperature measurements may be associated with the same predetermined operational frequency of the fan bank 110. Alternatively, each temperature measurement may be associated with a different predetermined operational frequency of the fan bank 110.

At 230, the desired operational frequency of the fan bank 110 is compared against a list of one or more undesired operational frequencies which may cause performance degradation or failure in such components. In one embodiment, the list is located in a look-up table for one or more components of interest in the system 100, and the look-up table is stored in one of the drives in the drive bank 120 or any other storage space in the system 100.

At 240, if there is not a match from the comparison at 230, the fan bank 110 is allowed to proceed at the desired operational frequency.

At 250, however, if there is a match, the fan bank 110 is not allowed to operate at the desired operational frequency, and such a frequency is de-allocated from a list of predetermined operational frequencies available to the fan bank 110. Instead, the fan bank 110 is set to operate at one of the other predetermined operational frequencies. For example, the cooling mechanisms are set to operate at the next higher predetermined operational frequency that can effectively provide thermal management while minimizing power consumption and avoiding undesired vibration of the one or more components of interest, such as avoiding the drive resonance of the drive bank 120.

The method 200 is repeated for each cycle of temperature measurement of the system 100 during run time or operation of the system 100.

Figure 3:
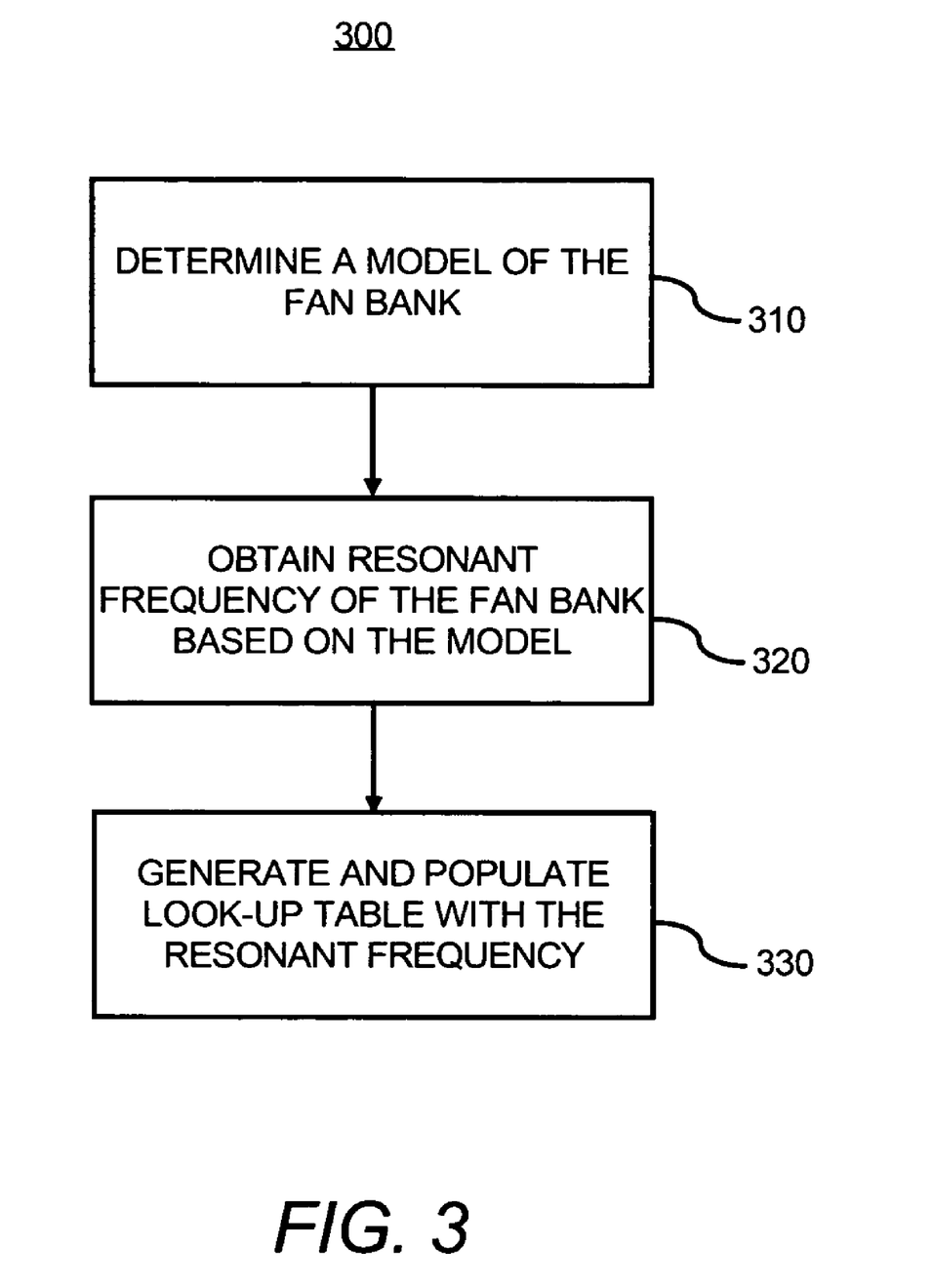
FIGS. 3-7 illustrate various methods for generating a look-up table of undesired frequencies for one or more components in the electronic system illustrated in FIG. 1A, in accordance with various embodiments of the present invention.

FIG. 3 illustrates a method 300 for generating or creating the look-up table mentioned at 230 above, in accordance with one embodiment of the present invention. One undesired frequency is the natural or resonant frequency, $\omega_n$, of the drive bank 120. At its resonant frequency, the drive bank 120 may be prone to displacement, which in turn causes a displacement of moving parts therein, such as drive heads that may be moved off tracks, and results in performance degradation or failure of one or more drives in the drive bank 120. In one embodiment, it is possible to calculate the resonant frequency, $\omega_n$, of the drive bank 120 based on a mathematical modeling of the drive bank 120.

Figure 1B:
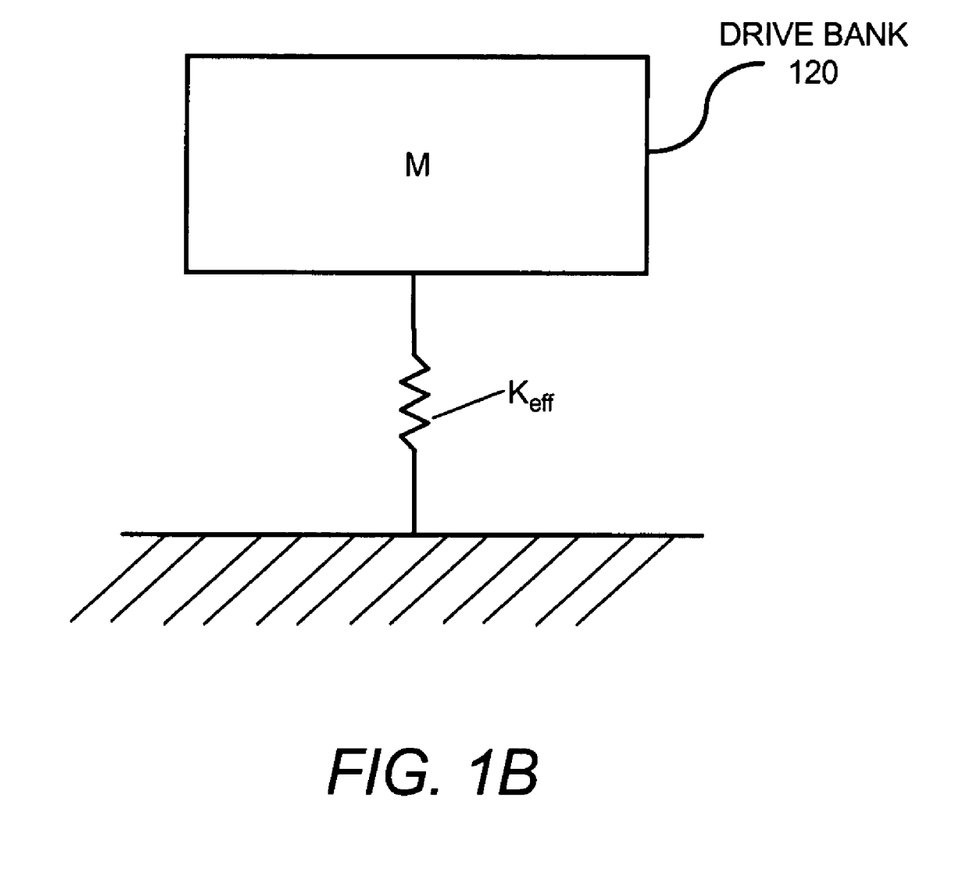
FIG. 1B illustrates a mathematical model of the electronic system illustrated in FIG. 1A, in accordance with one embodiment of the present invention.

Accordingly, at 310, a model of the interested system components, such as the drive bank 120, is determined. Like other components in the system 100, the drive bank 120 exhibits multiple degrees of freedom. Thus, the drive bank 120 may be difficult to analyze in detail. However, because the drive bank 120 is typically mounted to a frame or a supporting structure of the system 100, such a drive mounting and its stiffness may be used in a simple first-order analysis for modeling the drive bank 120. Thus, based on the stiffness of its drive mounting, the drive bank 120 may be modeled as a lumped mass system having a simple spring-mass relationship. FIG. 1B illustrates the modeling of the drive bank 120 as a spring-mass system, with a mass, m, of the drive bank 120 and an effective drive mounting stiffness constant, $K_{eff}$. As understood in the art, $K_{eff}$ is a constant value based on how the drive bank 120 is mounted and the type of material used for the corresponding mounting structure in the system 100.

At 320, with a known model of the drive bank 120 based on a known $K_{eff}$ and a known mass, m, of the drive bank 120, a finite element analysis of the spring-mass system representing the drive bank 120 may be performed in a manner known in the art in order to obtain the resonant frequency, $\omega_n$, of the drive bank 120.

At 330, the look-up table is generated and populated with the determined resonant frequency, $\omega_n$, of the drive bank 120.

In one embodiment, the method 300 is performed prior to run time of the system 100 (as illustrated in FIG. 2). Thus, at run time the system 100 may access the look-up table to operate the fan bank 110.

Figure 4:
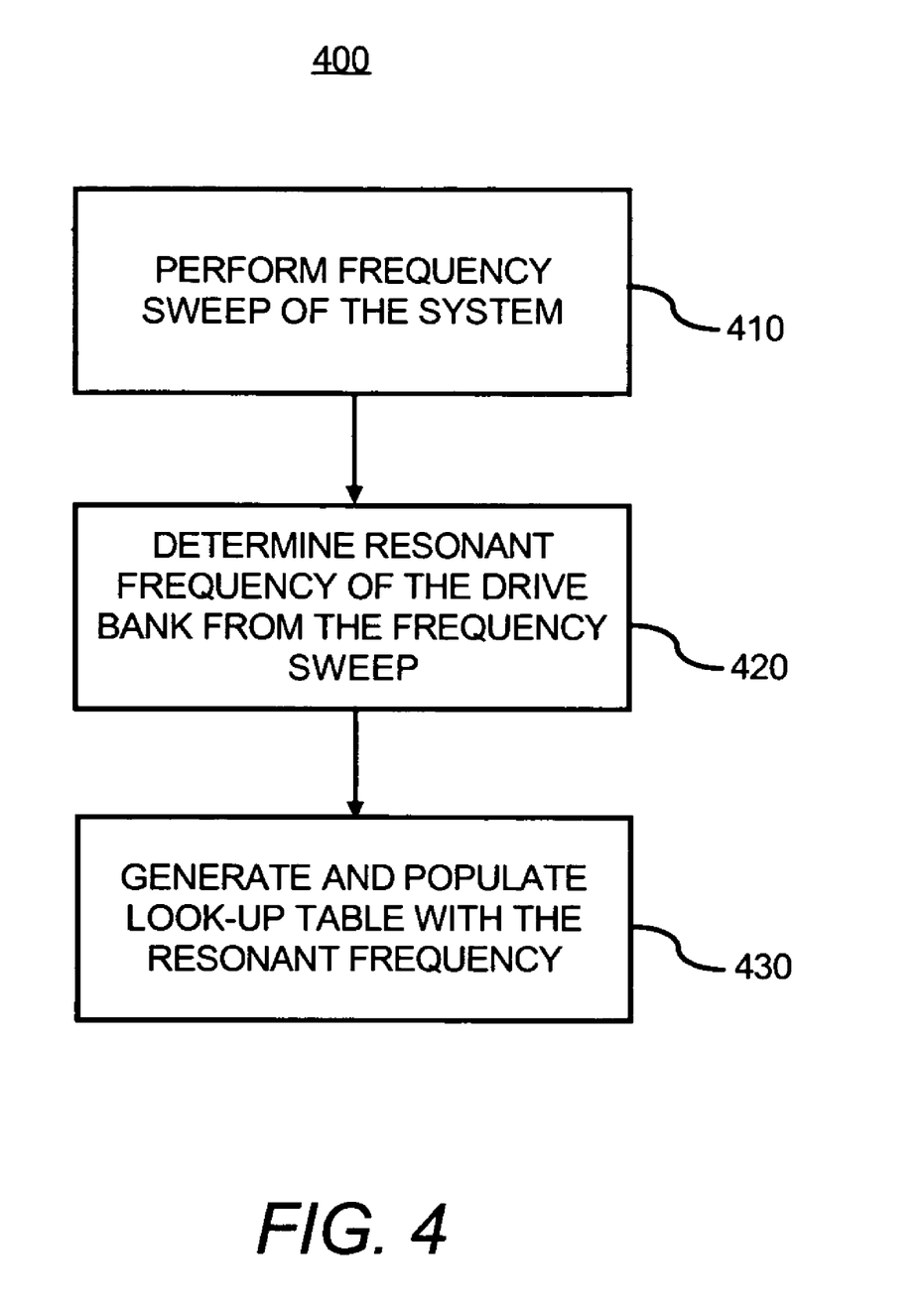

FIG. 4 illustrates another method 400 for generating or creating the look-up table mentioned at 230 in FIG. 2 above, in accordance with another embodiment of the present invention. In this embodiment, the resonant frequency, $\omega_n$, of the drive bank 120 is empirically obtained or measured by exciting or vibrating the system 100 at various different frequencies, such as a frequency range, with an external actuator. The displacements of the drive bank 120 (which indicate physical vibrations of the drive bank 120) are then measured at the excited frequencies to determine the resonant frequency, $\omega_n$, of the drive bank 120. In this embodiment, the system 100 is placed or mounted on a vibration table, which acts as an external actuator. One or more accelerometers or other displacement sensing devices are then mounted on the drive bank 120 at a rigid location, such as a base plate of the drive bank 120, to measure a displacement of the drive bank 120.

At 410, a frequency sweep is performed on the system 100, wherein the system 100 is stepped through various different vibrating frequencies, as produced by an external actuator, such as the aforementioned vibration table, to which the system 100 is coupled. For example, the vibration table is activated to vibrate at various different frequencies while the accelerometers are used to measure the displacement of the drive bank 120 in the system 100 (which is mounted on the vibration table). In addition, the system 100 may place on the vibration table at multiple different orientations for each frequency sweep. Alternative embodiments are contemplated wherein any known external actuator(s) other than a vibration table may be used to provide excitation or vibration of the system 100.

At 420, the resonant frequency, $\omega_n$, of the drive bank 120 is determined by identifying the vibrating frequency at which the drive bank 120 exhibits the largest displacement amplitude or one that is substantially higher than other amplitudes at other vibrating frequencies, as sensed by the accelerometers. In the case where there are multiple orientations for the placement of the system 100, multiple resonant frequencies are identified.

At 430, the look-up table is generated and populated with the determined resonant frequency (or frequencies), $\omega_n$, of the drive bank 120. It should be understood that for each determined resonant frequency, any of the associated harmonic frequencies also may be considered significant for contribution to the vibration of the system 100 and components therein. Thus, the look-up table may be populated with such harmonic frequencies as well.

In one embodiment, the method 400 is performed prior to run time of the system 100. Thus, the system 100 at run time, as illustrated in FIG. 2, may access the look-up table to operate the fan bank 110. In an alternative embodiment, the method 400 is performed during run time of the system 100 so that the look-up table is dynamically populated and updated with new undesired frequencies to prevent the fan bank 110 from operating at such frequencies in subsequent temperature measurement cycles.

Figure 5:
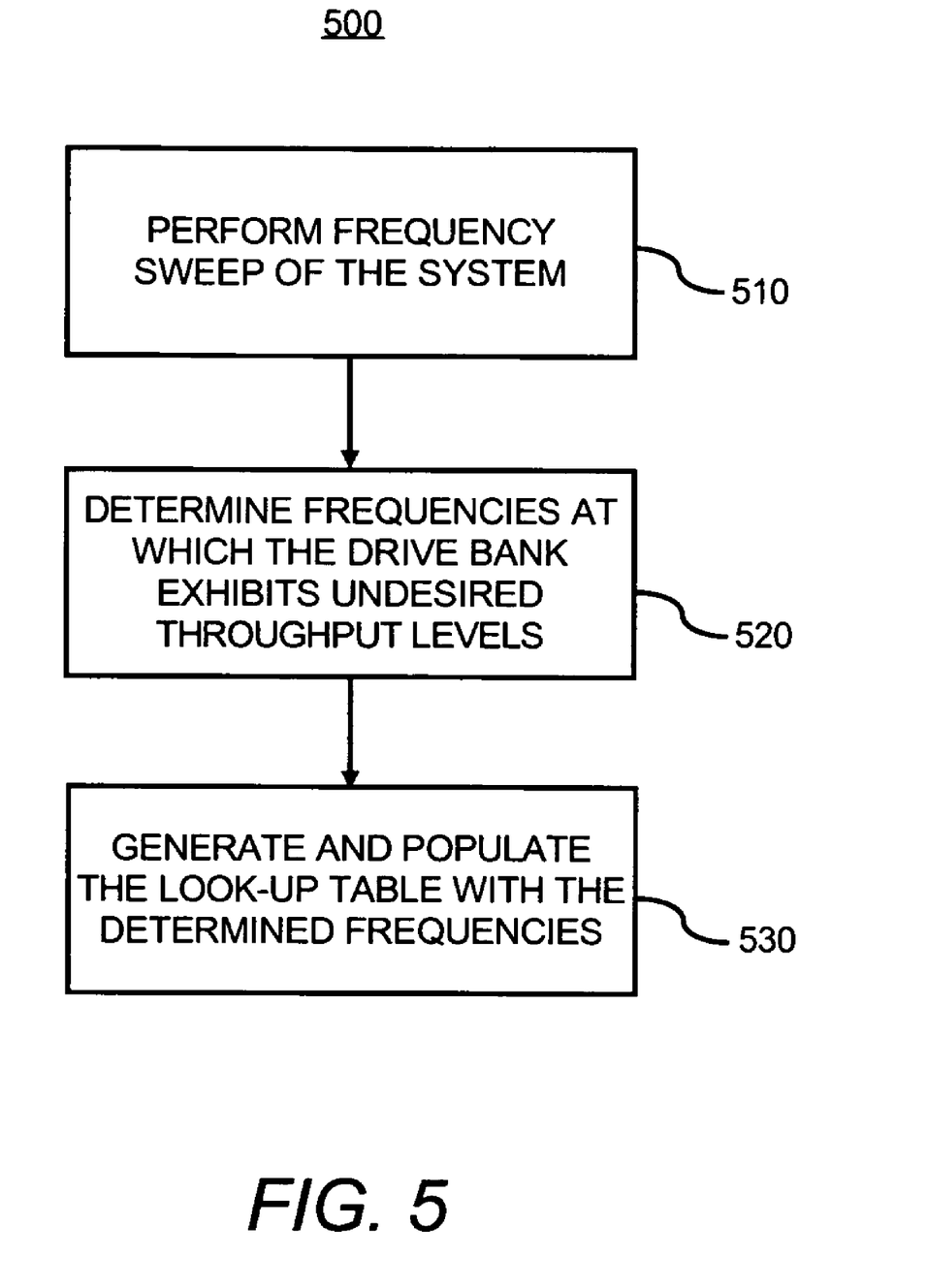

In addition to or in lieu of the resonant frequency, $\omega_n$, of the drive bank 120, other undesired frequencies of the drive bank 120 include those frequencies at which the drive bank 120 exhibits undesired throughput levels. As referred herein, throughput includes the productivity rates of a component's one or more functions. For example, with the drive bank 120, its throughputs include the rates at which data is read from or written to the drive bank 120, or both. Accordingly, FIG. 5 illustrates another method 500 for generating or creating the look-up table noted at 230 in FIG. 2 that is based on throughputs, in accordance with one embodiment of the present invention.

Accordingly, at 510, a frequency sweep is performed on the system 100, wherein the system 100 is stepped through various different vibrating frequencies, as caused by an external actuator, such as the aforementioned vibration table, to which the system 100 is coupled. Alternative embodiments are contemplated wherein any known external actuator(s) other than a vibration table may be used to provide excitation or vibration of the system 100.

At 520, instead of implementing accelerometers or other displacement sensing devices to measure the displacement of the drive bank 120, a throughput software program or application is implemented in the system 100 to obtain the throughputs of the drive bank 120. Any commercially available throughput software or application may be employed here. The vibrating frequency (or frequencies) at which the drive bank 120 exhibits undesired levels of throughputs are determined to be the undesired vibrating frequencies of the drive bank 120.

At 530, the look-up table is generated and populated with the undesired vibrating frequencies.

in one embodiment, the method 500 is performed prior to run time of the system 100. Thus, the system 100 at run time, as illustrated in FIG. 2, may access the look-up table in its operation of the fan bank 110. In an alternative embodiment, the method 500 is performed during run time of the system 100 (as illustrated in FIG. 2). Thus, the look-up table is dynamically populated and updated with new undesired frequencies to prevent the fan bank 110 from operating at such frequencies in subsequent temperature measurement cycles.

It should be understood that methods 400 and 500 may be combined so as to generate a look-up table and populate it with both the resonant frequency, $\omega_n$, of the drive bank 120 and any undesired frequencies at which the drive bank 120 exhibits undesired throughput levels.

Methods 400 and 500 have been described with reference to the use of an external actuator, such as a vibration table, to excite or provide vibration to the system 100. However, these methods are also applicable in an alternative embodiment, wherein the fan bank 110 itself is used from within the system 100 as an actuator to provide vibration to the system 100. As with the vibration table, a frequency sweep is performed on the fan bank 110, whereby it is activated to step through various different operational frequencies (such as an operational frequency range) so that the displacement of the drive bank 120 or its throughput levels can be measured as described earlier.

Figure 6:
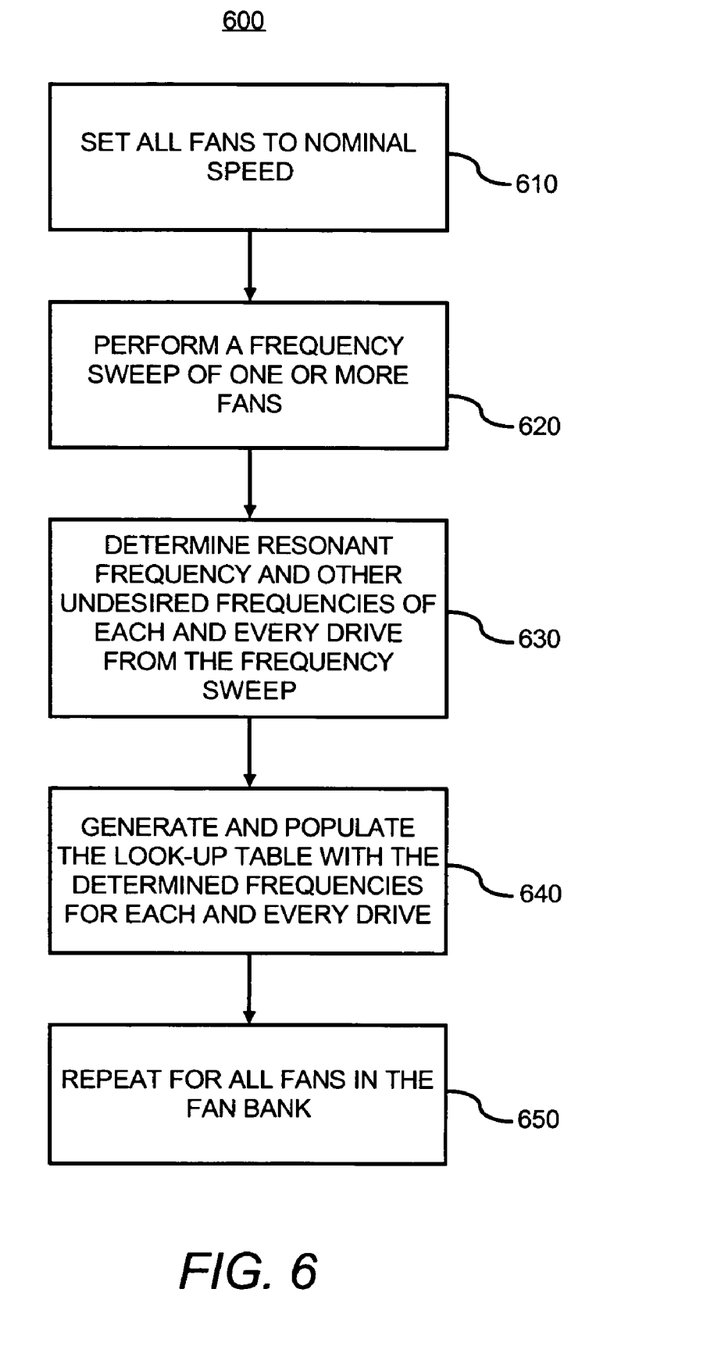

In the various embodiments described above, each of the drive bank 120 and the fan bank 110 is treated as a single entity. However, a multiplicity of drives in the drive bank 120 are potentially impacted by one or more fans in the fan bank 110. FIG. 6 illustrates a method 600 for generating or creating the look-up table as mentioned at 230 in FIG. 2, in accordance with another embodiment of the present invention, whereby the resulting look-up table includes a matrix of frequency entries, each cross-referenced by a fan i in the fan bank 110 and a drive j in the drive bank 120.

At 610, all of the fans in the fan bank 110 are activated to operate at a given nominal frequency, such as at a frequency predetermined to not cause undue vibration or affect the performance of the drives in the drive bank 120.

At 620, a frequency sweep is performed on one of the fans in the fan bank 110, whereby the fan is activated to step through various operational frequencies (e.g., in a operational frequency range of the fan). Alternative embodiments are contemplated wherein a subset of two or more fans in the fan bank 110 are activated for each frequency sweep.

At 630, a resonant frequency, $\omega_n$, of each drive in the drive bank 120 is determined based on amplitude measurements obtained by accelerometers or other displacement sensing devices, as described earlier. Alternative embodiments are contemplated, wherein in addition to, or in lieu of, undesired vibrating frequency (or frequencies) for each drive in the drive bank 120 is obtained based on drive throughputs, as also described earlier.

At 640, the look-up table is generated and populated with the determined resonant frequency, $\omega_n$, any other undesired vibrating frequencies, or both, of the drive bank 120.

At 650, the method 600 is repeated again for each and every fan in the fan bank 110, so that, as mentioned earlier, the resulting look-up table includes a matrix of frequency entries, each cross-referenced by a fan i and drive j.

In the method 600, it is assumed that the operation of multiple fans in the fan bank 110 do not combine to create unique excitation frequencies not covered by the generated look-up table.

in one embodiment, the method 600 is performed prior to run time of the system 100 (as illustrated in FIG. 2). Thus, at run time the system 100 may access the look-up table to operate the fan bank 110.

Figure 7:
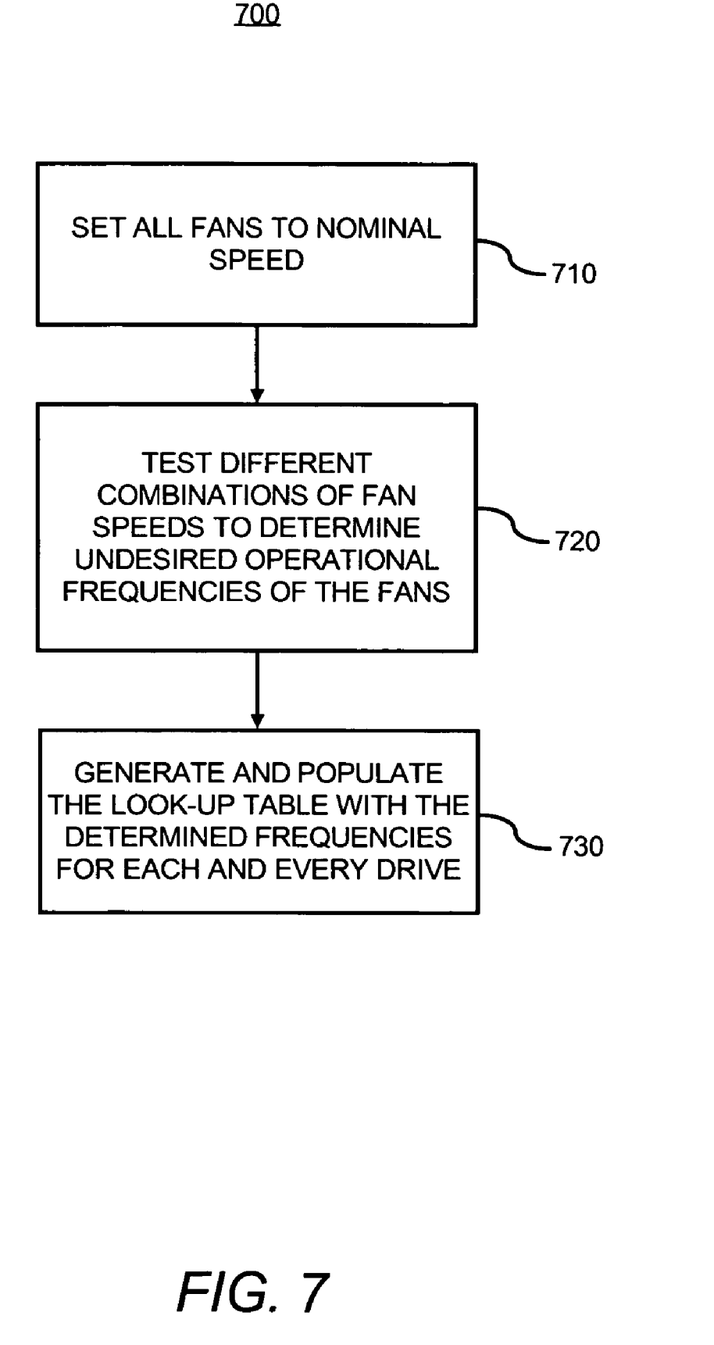

FIG. 7 illustrates still another method 700 for generating or creating the look-up table as mentioned at 230 in FIG. 2. However, instead of listing various undesired operational frequencies for the fan bank 110, the look-up table includes a list of undesired combinations of fan speeds for the individual fans in the fan bank 110 that may excite the resonant frequency or cause undesired throughput levels of each drive in the drive bank 120. For example, one undesired combination may be fan 1 at 150 Hz, fan 2 at 200 Hz, fan 3 at 250 Hz, fan 4 at 100 Hz, and fan 5 at 1300 Hz for the five fans in the fan bank 110. These undesired combinations are then avoided during run time of the system 100. It should be understood that a fan operating at, for example, 250 Hz, or 250 revolutions per second, translates into a fan rotation of 15,000 RPM or revolutions per minute. Also, a fan with four blades operating at 250 Hz can have a stimulus of 250 Hz*4, or 1000 Hz blade passing frequency.

Thus, at 710, all of the fans in the fan bank 110 are activated to operate at a given nominal frequency, such as at a frequency predetermined to not cause undue vibration or affect the performance of the drives in the drive bank 120.

At 720, different combinations of fan speeds are tested to determine whether any of such combinations cause substantially high displacement of any of the drives (denoting resonant frequencies) in the drive bank 120 or undesired throughput levels for any of the drives; as described earlier.

At 730, a look-up table is generated and populated with the undesired combinations so that during run time of the system 100 (as illustrated in FIG. 2), whenever there is a match in which one of the undesired combinations is about to be implemented by the fans in the fan bank 110 (see 230, FIG. 2), such a combination is rejected and the speed of at least one of the fans is modified to another predetermined speed so as not to further match any of the undesired combinations stored in the look-up table.

in one embodiment, the method 700 is performed prior to run time of the system 100 (as illustrated in FIG. 2). Thus, at run time the system 100 may access the look-up table to operate the fan bank 110.

It should be understood that the methods 600 and 700 are also applicable for an electronic system 100 that includes multiple fan banks 110, each operating either as a single cooling unit or multiple cooling units.

Accordingly, the aforementioned embodiments of the present invention decouple the operational frequency of the fan bank 110 from the undesired frequencies of the drive bank 120 that may cause undue or unwanted vibration in the drive bank 120. Thus, the fan bank 110 is treated as the source of the unwanted vibration, and the drive bank 120 is treated as the component of interest for reducing or eliminating performance degradation or failure. However, it should be understood that the aforementioned embodiments are applicable to any sources of unwanted vibration (including any cooling mechanism other than a fan or the fan bank 110) and any component of interest (other than a drive or drive bank 120) for reducing or eliminating performance degradation or failure. For example, one of the drives in the drive bank 120 itself may cause unwanted vibration to one or more other drives in the drive bank 120, whereby the drive speed of the vibration-causing drive may be modified in accordance with various embodiments of the present invention in order to de-allocate those speeds that may cause the unwanted vibration. Likewise, one of the fans in the fan bank 110 may be a component of interest, to which unwanted vibration may be caused by other fans in the fan bank 110 that destabilizes the interested fan at either run-time or down-time.

Figure 8:
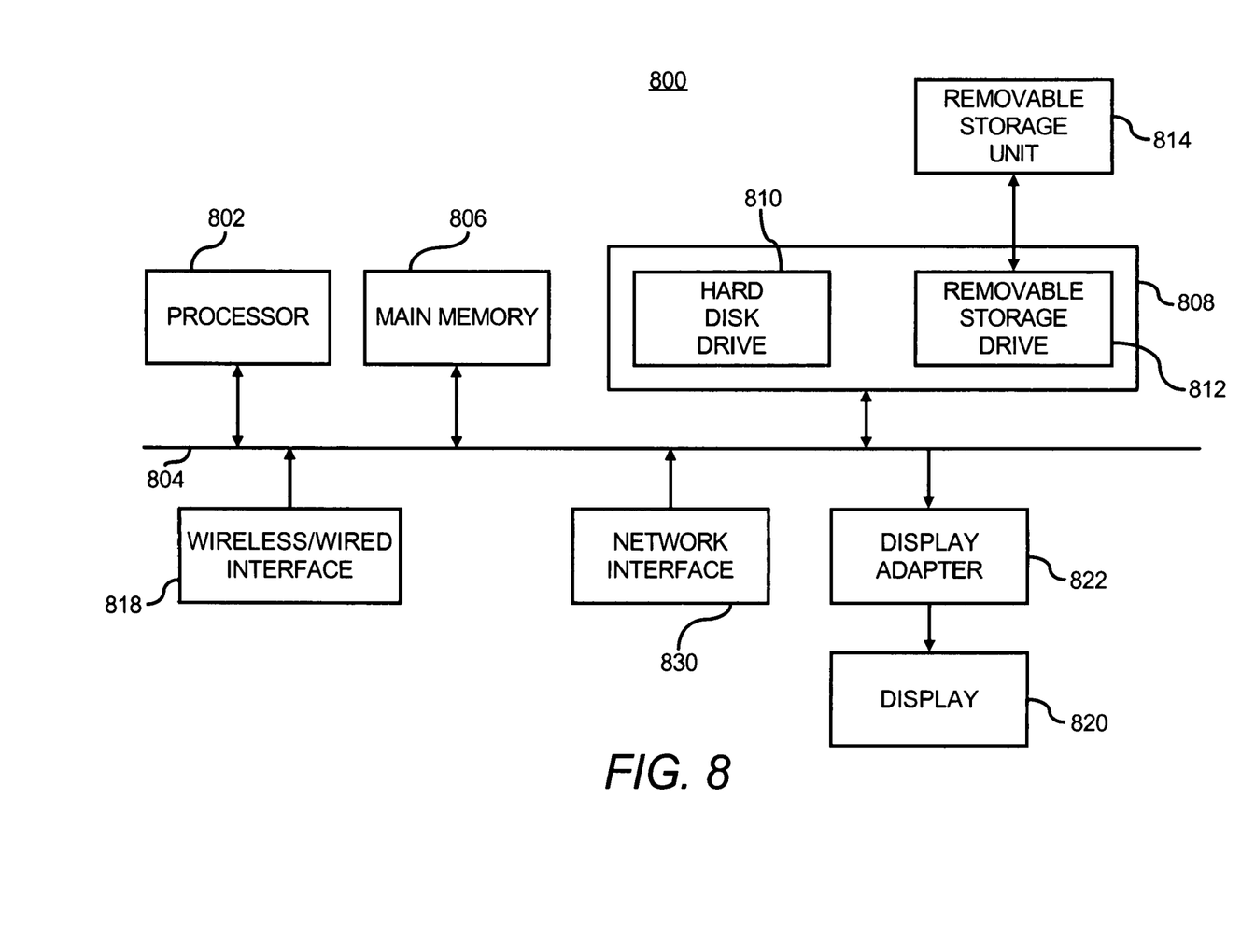
FIG. 8 illustrates an exemplary block diagram of a computerized module that is operable to implement one or more methods described in FIGS. 3-7, in accordance with one embodiment of the present invention.

FIG. 8 illustrates an exemplary block diagram of a computerized module 800 that is operable to implement one or more methods 200-700 described above. The computerized module 800 may be located within or external to the electronic system 100. It should be understood that a more sophisticated computerized module is operable to be used. Furthermore, components may be added or removed from the computerized module 800 to provide the desired functionality.

The computerized module 800 includes one or more processors, such as processor 802, providing an execution platform for executing software. The processor 802 may be a common, general purpose processor used in the electronic system 100. Thus, the computerized module 800 includes one or more single-core or multi-core processors of any of a number of computer processors, such as processors from Intel and AMD. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 802 are communicated over a communication bus 804, which may be a common bus used in the electronic system 100. The computerized module 800 also includes a main memory 806 where software is resident during runtime, and a secondary memory 808. The secondary memory 808 may also be a computer readable medium (CRM) that may be used to store the software programs, applications, or modules for implementing one or more of the methods 200-700, including the aforementioned look-up table of frequencies. The main memory 806 and secondary memory 808 (and an optional removable storage unit 814) each includes, for example, a hard disk drive and/or a removable storage drive 812 representing a floppy diskette drive, a magnetic tape drive, a compact disk drive, etc., or a nonvolatile memory where a copy of the software may be stored. Thus, the main memory 806 or the secondary memory 808, or both, may be one of the drives in the drive bank 120 in the electronic system 100. In one example, the secondary memory 808 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions. The computerized module 800 may include a display 820 connected via a display adapter 822, user interfaces comprising a wireless interface for establishing wire connectivity with clients. Again, the display 820 may be a part or used by the electronic system 100 for the display of information. A network interface 830 is provided for communicating with networks such as a local area network (LAN), a wide area network (WAN), or a public data network such as the Internet.

What has been described and illustrated herein are embodiments along with some of their variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for reducing vibration in an electronic system comprising at least one fan for cooling the electronic system and at least one memory disc drive that is susceptible to performance degradation around a resonant frequency of the at least one memory disc drive, said method comprising:
    determining the resonant frequency of the at least one memory disc drive;
    measuring a temperature of the electronic system at run time;
    determining a desired operational frequency of the at least one fan based upon the measured temperature of the electronic system;
    determining whether the desired operational frequency of the at least one fan is the resonant frequency of the at least one memory disc drive; and
    operating the at least one fan at a frequency other than the desired operational frequency in response to a determination that the desired operational frequency is the resonant frequency of the at least one memory disc drive during run time of the electronic system.

2. The method of claim 1, wherein the electronic system is one of a mainframe computer, a server, a desktop personal computer (PC), a laptop PC, a notebook PC, a projector, an electronic data storage array, an electronic data bank, a personal digital assistant (PDA), and an MP3 player.

3. The method of claim 1, further comprising:
    determining a mathematical model of the at least one memory disc drive; and wherein determining the resonant frequency includes determining the resonant frequency of the at least one memory disc drive based on the determined mathematical model.

4. The method of claim 1, wherein operating the at least one fan comprises:
in response to a determination that the desired operational frequency is not the determined resonant frequency, operating the fan at the desired operational frequency.

5. The method of claim 1, wherein determining the resonant frequency comprises:
vibrating the electronic system through a range of frequencies with an external vibrating source;
measuring displacements of the at least one memory disc drive throughout the range of vibrating frequencies; and
determining the resonant frequency of the at least one memory disc drive based on the measured displacements.

6. The method of claim 1, further comprising:
vibrating the electronic system through a range of frequencies with an external vibrating source; and
determining at least one frequency in the frequency range at which the at least one memory disc drive exhibits an undesired throughput level; and
operating the at least one fan includes operating the at least one fan at a frequency other than the determined at least one frequency at which the at least one memory disc drive exhibits an undesired throughput level.

7. The method of claim 1, wherein determining the resonant frequency comprises:
vibrating the electronic system by operating the at least one source component through a range of frequencies;
measuring displacements of the at least one memory disc drive throughout the range of vibrating frequencies; and
determining the resonant frequency of the at least one memory disc drive based on the measured displacements.

8. The method of claim 1, further comprising:
vibrating the electronic system by operating the at least one fan through a range of frequencies; and
determining at least one frequency in the frequency range at which the at least one memory disc drive exhibits an undesired throughput level; and
operating the at least one fan includes operating the at least one fan at a frequency other than the determined at least one frequency at which the at least one memory disc drive exhibits an undesired throughput level.

9. The method of claim 1, wherein the at least one memory disc drive includes a plurality of memory disc drives and the at least one fan includes a plurality of fans, the method further comprises:
vibrating the electronic system by operating, one at a time, each one of the plurality of fans through a range of frequencies;
measuring displacements of the plurality of memory disc drives throughout the range of vibrating frequencies of each of the plurality of fans;
for each operating one of the plurality of fans, determining a resonant frequency of each and every one of the memory disc drives based on the measured displacements of each memory disc drive.

10. The method of claim 9, further comprising:
determining at least one undesired frequency in the frequency range of each of the plurality of fans at which each of the plurality of memory disc drives exhibits an undesired throughput level.

11. The method of claim 10, wherein operating the at least one fan includes:
operating the plurality of fans together, such that each of the plurality of fans is operated at the first frequency other than the determined resonant frequencies and the determined undesired frequencies of the plurality of memory disc drives based on the single operation of each fan.

12. A method for reducing vibration in an electronic system that includes a plurality of fans and a plurality of memory disc drives that are susceptible to performance degradation around a resonant frequency of the plurality of fans, the method comprising:
vibrating the electronic system by operating the plurality of fans together with different combinations of operational frequencies for the plurality of fans, each of the combinations includes an assigned operational frequency to each of the plurality of fans;
measuring displacements of the plurality of memory disc drives for the different combinations of operational frequencies for the plurality of fans;
determining at least one combination from the different combinations that excite a resonant frequency of at least one of the plurality of memory disc drives based on the measured displacements;
measuring a temperature of the electronic system at run time;
determining a desired combination of operational frequencies of the plurality of fans based upon the measured temperature of the electronic system;
determining whether the desired combination of operational frequencies of the plurality of fans is near the determined combination that has been determined to excite the resonant frequency of the at least one memory disc drive; and
at run time of the electronic system, operating the plurality of fans at a combination of operational frequencies that is different from the determined combination that excites the resonant frequency of the at least one memory disc drive.

13. The method of claim 12, further comprising:
measuring throughput levels of the plurality of memory disc drives for the different combinations of operational frequencies for the plurality of fans;
wherein determining the at least one combination further comprises determining at least one combination from the different combinations that causes an undesired throughput level in at least one of the plurality of memory disc drives; and
at run time of the electronic system, further operating the plurality of fans at a combination of operational frequencies that is different from the determined combination that causes the undesired throughput level.

14. The method of claim 12, wherein the electronic system is one of a mainframe computer, a server, a personal computer (PC), a projector, an electronic data storage array, and an electronic data bank.

15. The method of claim 12, wherein the plurality of source components includes at least one of a cooling fan, a cooling pump, and an air compressor.

16. A computer readable storage medium on which is encoded program code for reducing vibration in an electronic system comprising at least one fan for cooling the electronic system and at least one memory disc drive that is susceptible to performance degradation around a resonant frequency of the at least one memory disc drive, the encoded program code comprising:

program code for determining the resonant frequency of the at least one memory disc drive;
program code for receiving a measurement of the electronic system at run time;
program code for determining a desired operational frequency of the at least one fan based upon the measured temperature of the electronic system;
program code for determining whether the desired operational frequency of the at least one fan is the resonant frequency of the at least one memory disc drive; and
program code for operating the at least one fan at a frequency other than the desired operational frequency in response to a determination that the desired operational frequency is near the resonant frequency of the at least one memory disc drive during run time of the electronic system.

* * * * *

UNITED STATES PATENT AND TRADEMARK OFFICE
CERTIFICATE OF CORRECTION

| | |
|---|---|
| PATENT NO. | : 7,877,167 B1 |
| APPLICATION NO. | : 11/645400 |
| DATED | : January 25, 2011 |
| INVENTOR(S) | : Chandrakant D. Patel et al. |

It is certified that error appears in the above-identified patent and that said Letters Patent is hereby corrected as shown below:

In column 10, line 32, in Claim 12, before "the" delete "near".

In column 12, line 4, in Claim 16, before "the" delete "near".

Signed and Sealed this
Twenty-fourth Day of April, 2012

David J. Kappos
*Director of the United States Patent and Trademark Office*